United States Patent [19]

Stoka et al.

[11] Patent Number: 4,469,205
[45] Date of Patent: Sep. 4, 1984

[54] BRAKE SHOE ASSEMBLY

[75] Inventors: Roberto Stoka, Nauheim; Uwe Kley, Schwalbach, both of Fed. Rep. of Germany

[73] Assignee: ITT Industries, Inc., New York, N.Y.

[21] Appl. No.: 411,754

[22] Filed: Aug. 26, 1982

[30] Foreign Application Priority Data

Oct. 8, 1981 [DE] Fed. Rep. of Germany ....... 3139942

[51] Int. Cl.³ .............................................. F16D 65/04
[52] U.S. Cl. .................................. 188/234; 188/73.38
[58] Field of Search .................... 188/234, 236, 250 F, 188/250 G, 253, 261, 73.35, 73.37, 73.38, 73.43; 267/158, 159, 160, 36 R

[56] References Cited

U.S. PATENT DOCUMENTS 3,782,508 1/1974 Cook .................................. 188/73.43
3,915,263 10/1975 Courbot ............................. 188/73.43
4,290,508 9/1981 Baum ................................. 188/73.38

FOREIGN PATENT DOCUMENTS 0852394 10/1952 Fed. Rep. of Germany ...... 267/158
2140011 2/1973 Fed. Rep. of Germany ...... 267/158

Primary Examiner—Bruce H. Stoner, Jr.
Assistant Examiner—Robert J. Oberleitner
Attorney, Agent, or Firm—James B. Raden; Marvin M. Chaban

[57] ABSTRACT

A brake shoe assembly comprises a carrier plate and a brake shoe spring having between its ends a loop-shaped portion. The loop-shaped portion is supported in a recess in the carrier plate which opens onto a peripheral surface of the carrier plate via an opening. The largest width of the recess is greater than the smallest width of the opening. A fastening arrangement retains the loop-shaped portion of the spring in the recess against slipping out of the latter in the axial direction normal to the carrier plate. The fastening arrangement may include a projection in the recess which engages in a slot of the spring, a groove in the recess which partially receives the loop-shaped portion of the spring, or a pair of lugs at the axial ends of the loop-shaped portion of the spring which confine the carrier plate between themselves.

7 Claims, 6 Drawing Figures

BRAKE SHOE ASSEMBLY

BACKGROUND OF THE INVENTION

The present invention relates to a brake shoe assembly.

There is already known a brake shoe assembly comprising a carrier plate, to which friction material is secured, and a brake shoe spring having between its ends an arcuate or loop-shaped portion which is supported in a recess in the brake shoe, this recess being open towards the edge of the brake shoe, with the largest width of the recess being greater than the smallest width of the opening. A conventional brake shoe assembly of this type is known from the German printed and published patent application No. 29 37 149. In this construction, the brake shoe spring is held in the recess of the carrier plate radially and simultaneously in a circumferential direction of the brake shoe due to the engagement of the spring at least with the surface bounding the recess. The brake shoe holding spring is retained in position in axial direction of the recess, that is, normal to the peripheral opening of the recess, only due to the frictional contact between the brake shoe holding spring and carrier plate. This frictional contact is attributable to the clamping engagement between the loop-shaped portion of the brake shoe spring and the surface bounding the recess. If, for instance, the amount of friction between the ends of the brake shoe spring, which bear against a brake housing part, and the brake housing part is higher than the amount of friction between the loop-shaped portion and the recess, the brake shoe spring is not able to follow the movement of the brake shoe in the event of an axial displacement of the brake shoe, such as that resulting from the wear of the friction material. When this occurs, the brake shoe spring slips out of the recess and can no more fulfill its function.

SUMMARY OF THE INVENTION

Accordingly, it is an object of the present invention to avoid the disadvantages of the prior art.

More particularly, it is an object of the present invention to provide a brake shoe assembly of the type hereunder consideration which does not possess the disadvantages of the conventional assemblies of this type.

Still another object of the present invention is to so construct the brake shoe assembly of the above type as to safely retain the spring in the recess against movement out of the recess in direction normal to the plane of the carrier plate.

It is yet another object of the present invention to so design the assembly as not to interfere with the introduction of the arcuate portion of the spring into the recess in the radial direction of the latter.

A concomitant object of the invention is to so construct the assembly of the above type as to be simple in construction, easy and inexpensive to manufacture, easy to use, and reliable in operation nevertheless.

In pursuance of these objects and others which will become apparent hereafter, one feature of the present invention resides in a brake shoe assembly comprising a brake shoe including a carrier member that extends along a plane, and having a peripheral surface and a recess that opens onto a region of the peripheral surface and extends along an axis transverse to said plane, the recess having a narrower width, as considered in the aforementioned plane, closer to the aforementioned region than more remotely therefrom; a spring member having two end portions and an arcuate portion between the end portions, the arcuate portion being substantially conformingly received in, and the end portions being situated outwardly of, the recess in an assembled position of the spring member relative to the brake shoe; and fastening means on at least one, and positively engaging in the assembled position the other, of the spring and carrier members for retaining the spring member on the brake shoe against relative movement at least in one axial direction of the recess. This affords, in addition to the radial securing in position of the brake shoe spring, an axial retention in position which prevents the spring from slipping out of the recess. It will be furthermore advantageous that the positive engagement provided by the fastening means also inhibits a swinging movement of the brake shoe in relation to its support at the brake shoe spring. A rotationally secured coupling of the brake shoe spring to the brake shoe will be achieved thereby, so that rattling noises cannot occur when driving.

In an advantageous construction according to this invention, the brake shoe spring is designed as a leaf spring, and a projection is shaped at the recess of the carrier plate projecting into a slot of the leaf spring. The brake shoe spring is a punched part made of sheet metal, and its slot is punched out simultaneously with the punching process. Additional manufacturing costs with respect to the brake shoe spring are thereby avoided. The shaping of the projection may be achieved, for example, after the punching process of the carrier plate in that a scraping tool is pressed into the wall of the opening of the recess and in that, in doing so, the material which rolls back chip-like in front of this tool is urged against a counter-holding tool, as a result of which the desired shape of the projection will be obtained.

It will be expedient for the projection completely to fill the slot. It will be obtained by the projection abutting on the surfaces of the slot that both the displacement of the brake shoe axially of the recess and the aforementioned swing movement of the brake shoe will be inhibited.

Suitably, the projection extends over the peripheral length of the recess. To achieve this, the recess will be first punched to a smaller size as compared to the finished size during the punching-out of the carrier plate, and, subsequently, the material which has been scraped off the edge of the recess by means of a scraping tool used for finishing to final size and which rolls back chip-like in front of this tool will be pushed in this recess in front of the tool to form the projection or ridge. The projection may then be pressed to assume its final shape by two shaping tools moving towards each other. If it is desired to form the projection at the edge of the carrier plate, only one scraping tool will be required, while two scraping tools that move towards each other will be required if it is desired to form the projection in the central region of the recess. These scraping tools may also be able simultaneously to carry out the compression shaping process.

It is a frequent demand when using brake shoe springs that they shall not project beyond the edges of the recess. This demand is met in the inventive brake shoe assembly, for example, in that the width of the leaf spring is not greater than the thickness of the carrier plate. In this arrangement, the projection is placed in the middle of the opening of the recess and projects into the slot of the brake shoe spring located in the middle of the loop-shaped portion. This brake shoe assembly affords a fastening of the brake-shoe spring to the carrier plate which rigidly and reliably couples both parts to one another and nevertheless enables a quick mounting or dismounting which will be attained by simply compressing the loop-shaped portion and by subsequently fitting it radially to or removing it radially from the carrier plate.

In another advantageous constuction of the present invention, a groove is formed in the recess. Then, the brake shoe spring extends into the groove. When employing a wire spring, the groove is of a part-circular cross section. When employing a leaf spring, the groove is of rectangular cross-section. It will be expedient to shape one projection as a collar, while the opposite projection may be formed by at least one web which engages in a slot of the brake shoe spring opening towards the web. The annular collar or rib can be manufactured, for instance, by means of a scraping tool, as has been described already above. After the fitting of the brake-shoe spring, the projections arranged on the opposite edge of the recess will be upset, by means of an embossing stamp, into the slots of the brake shoe spring provided for this purpose. There is a positive engagement between the brake-shoe spring and the carrier plate in this arrangement, and it will be no longer possible to radially remove the brake shoe spring after the upsetting operation. If only one projection engages the slot of the brake shoe spring provided for this purpose, and if this projection is positioned at the carrier plate in the assembling direction of the brake-shoe spring, repeated mounting and dismounting of the brake shoe spring will remain possible.

According to another advantageous concept of this invention, sheet-metal lugs are arranged at the end surfaces of the loop-shaped portion of the brake shoe spring. These lugs confine the carrier plate between themselves at the area of the recess. The sheet-metal lugs are shaped at the brake-shoe spring while it is being punched. No additional manufacturing costs will be incurred thereby. After the brake shoe spring has been fitted to the carrier plate, the sheet-metal lugs will be folded and urged against the carrier plate. It is, however, also possible to fold the sheet-metal lugs already prior to the mounting of the brake shoe spring so that, after the assembly, the resilient sheet-metal lugs will abut the carrier plate in positive and frictional engagement therewith.

Advantageously, there is embossed an indentation at the end surface of the carrier plate close to the piston in the area of the recess, which indentation stands out as an elevation from the opposite end surfaces of the carrier plate. It will be achieved by virtue of this embossing that the brake shoe spring does not project beyond the end surface of the carrier plate close to the piston in the area of the loop-shaped portion.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENTS

Figure 6:
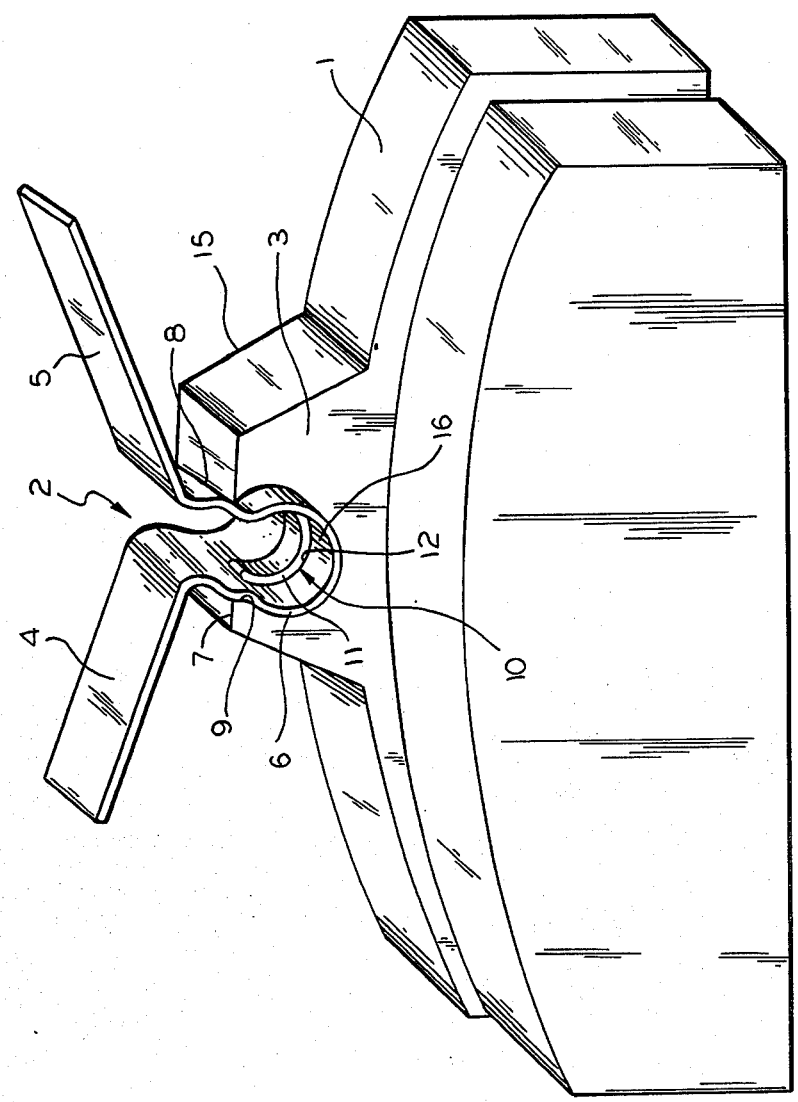
FIG. 6 is a perspective view of the brake shoe assembly of FIG. 1.

Referring now to the drawing in detail, it may be seen that it shows several modifications of the brake shoe assembly according to the invention. Therefore, the same reference numerals have been assigned to the corresponding parts. Each assembly comprises a carrier plate 1 and a brake shoe spring 2. Friction material or lining, shown as a friction pad in FIG. 6, is secured to an end surface 3 of the carrier plate 1. An arcuate or a loop-shaped portion 6 is formed between the ends 4, 5 of the brake shoe spring 2. The loop-shaped portion 6 is supported in a recess 8 provided in the carrier plate 1. The recess 8 is open towards an edge or peripheral portion 7 of the carrier plate 1. The largest width W1 of the recess 8 is greater than the smallest width W2 of an opening 9 that opens onto the peripheral portion 7. The recess 8 is a substantially cylindrical bore in which the loop-shaped portion 6 is supported. Arranged at the carrier plate 1 and/or at the brake-shoe spring 2 are fastening means 10 which provide for a positive engagement normal to the opening 9 of the recess 8, that is, axially of the recess 8. The brake shoe spring 2 is designed as a leaf spring.

Figure 1:
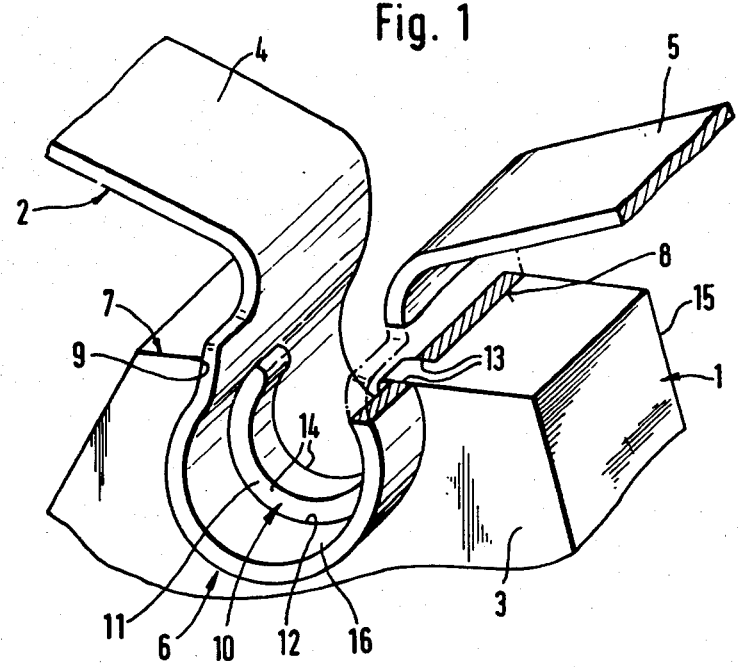
FIG. 1 is a perspective partial view of the assembly of the invention in the area where the brake shoe spring is fastened to the carrier plate.

In FIG. 1 of the drawing, the fastening means 10 is constituted by a projection formed as a partially annular collar or ridge 11 which penetrates into a slot 12 of rectangular cross section provided in the leaf spring 2. The annular collar 11 extends over the periphery of the recess 8, ends flush with the end surface 3 of the carrier plate 1 and extends over a part of the axial dimension of the open recess 8. Surfaces 13 forming the rectangular cross-section of the slot 12 bear against associated surfaces 14 of the annular collar 11 which lie opposite to them, as a result of which the annular collar 11 fills up the slot 12. The loop-shaped portion 6 ends flush with an end surface 15 of the carrier plate 1 lying opposite to the end surface 3. A front part 16 of the loop-shaped portion 6 projects from the end surface 3 so that the width of the loop-shaped portion 6 in the longitudinal or axial direction of the recess 8 is larger than the thickness of the carrier plate 3. At the transition from the loop-shaped portion 6 to the ends 4, 5 of the brake shoe spring 2, the width of the brake shoe spring 2 is reduced to correspond to the thickness of the carrier plate 1.

Figure 2:
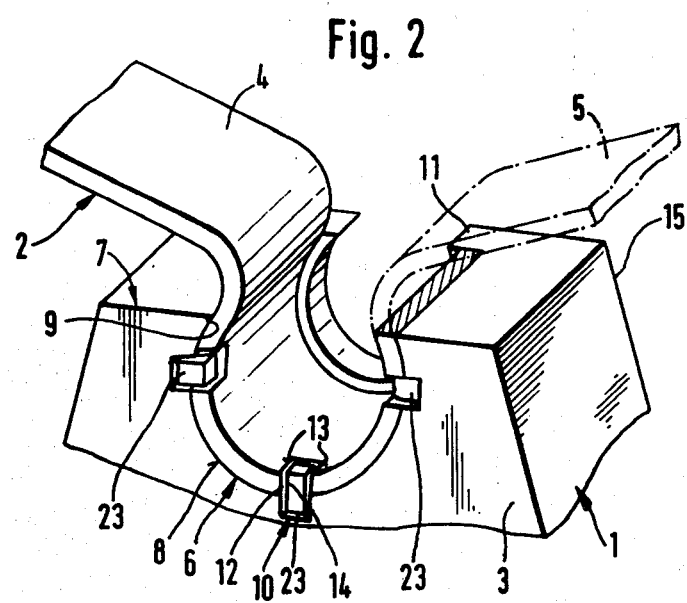
FIG. 2 is a view similar to FIG. 1 but showing a modification.
Figure 3:
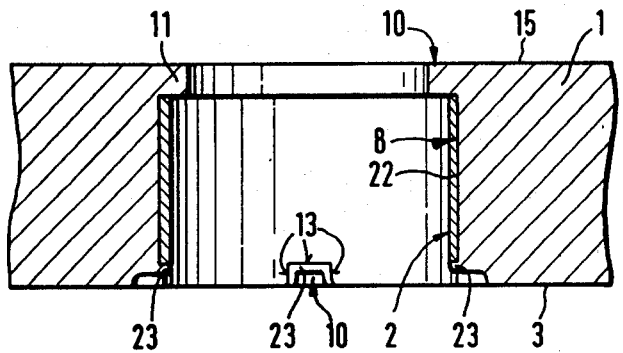
FIG. 3 is a partial cross-sectional view through the area where the brake shoe spring is fastened to the carrier plate according to FIG. 2.

In FIGS. 2 and 3 of the drawing, the width of the brake shoe spring 2 is smaller than the thickness of the carrier plate 1. The loop-shaped portion 6 is supported in the recess 8. The carrier plate 1 is provided with a groove 22 within the recess 6. The loop-shaped portion 6 is axially held in the axial direction of the open recess 8 by fastening means 10 in the form of projections which extend on both sides of the recess 8 at the end surfaces 3, 15 of the carrier plate 1. In this arrangement, the fastening means 10 again includes the annular collar or rib 11 having a shape corresponding to that of the annular collar 11 according to FIG. 1 of the drawing. However, the annular collar 11 of FIG. 3 is situated on the other side of the carrier plate 1 at the end surface 15. The fastening means 10 further includes webs 23 which are shaped at the end surface 3 at the edge of the open recess 8 and which are manufactured, for example, by upsetting. The webs 23 engage in slots 12 of the brake shoe spring 2 which are open towards the webs 23. The surfaces 13 bounding the slot 12 bear against the surfaces 14 of the webs 23 which lie opposite to them.

Figure 4:
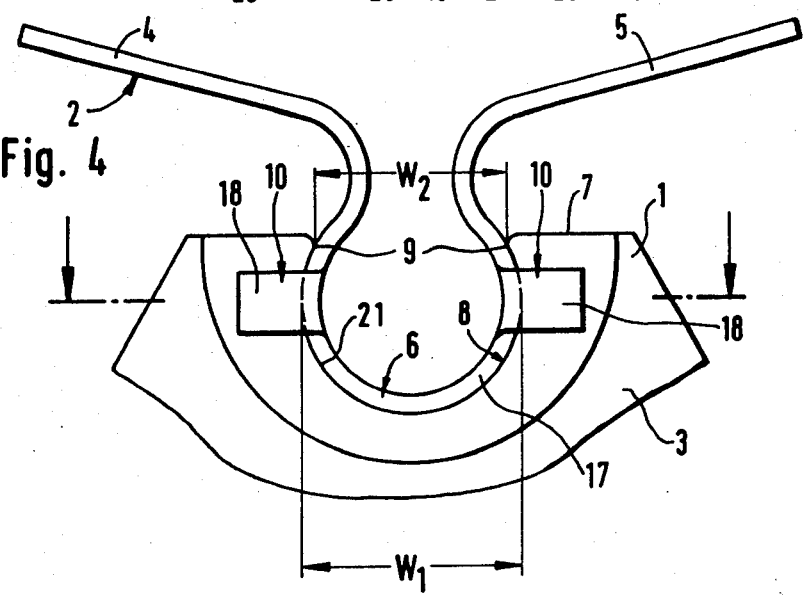
FIG. 4 is a top plan view of still another modified construction of the invention at the area where the brake shoe spring is fastened to the carrier plate.
Figure 5:
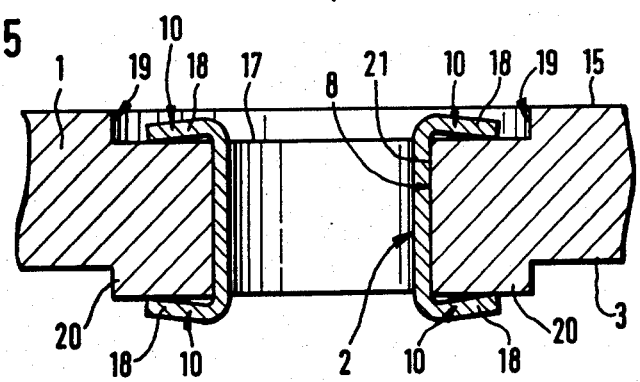
FIG. 5 is a partial cross-sectional view taken through the modified construction according to FIG. 4.

In FIGS. 4 and 5 of the drawing, the fastening means 10 includes sheet-metal lugs 18 arranged at the surfaces 17 on both sides of the loop-shaped portion 6. The lugs 18 confine the carrier plate 1 between themselves at the area of the recess 8. At the end surface 15 of the carrier plate 1 in the area of the recess 8, there is embossed an indentation 19 which stands out as an elevation 20 from the opposite end surface 3 of the carrier plate 1. The recess 8 is formed by a smooth cylinder bore 21. The lug 18 close to the end surface 15 of the carrier plate 1 is accommodated in the indentation 19.

While we have described above the principles of our invention in connection with specific apparatus, it is to be clearly understood that this description is made only by way of example and not as a limitation to the scope of our invention as set forth in the accompanying claims.

We claim:

1. A brake shoe assembly comprising:
   a brake shoe including a carrier member that extends along a plane, and having a peripheral surface and a recess that opens onto a region of said peripheral surface and extends along an axis transverse to said plane, said recess having a narrower width, as considered in said plane, closer to said region than more remotely therefrom;
   a spring member having two end portions and an arcuate portion between said end portions, said arcuate portion being substantially conformingly received in, and said end portions being situated outwardly of, said recess in an assembled position of said spring member relative to said brake shoe;
   fastening means on at least one, and positively engaging in said assembled position the other, of said spring and carrier members for retaining said spring member on said brake shoe against relative movement at least in one axial direction of said recess, wherein said spring member is a leaf spring having at least one opening; and wherein said fastening means includes at least one projection on said carrier member received in said opening in said assembled position, and wherein said opening is situated in said arcuate portion of said leaf spring; and wherein said projection is situated within said recess.

2. The brake shoe assembly as defined in claim 1, wherein said opening has a slot-shaped configuration; and wherein said projection has a ridge-shaped configuration substantially conforming to that of said opening.

3. The brake shoe assembly as defined in claim 2, wherein said slot-shaped opening and said ridge-shaped projection extend substantially circumferentially of said recess in said assembled position.

4. A brake shoe assembly comprising:
   a brake shoe including a carrier member that extends along a plane, and having a peripheral surface and a recess that opens onto a region of said peripheral surface and extends along an axis transverse to said plane, said recess having a narrower width, as considered in said plane, closer to said region than more remotely therefrom;
   a spring member having two end portions and an arcuate portion between said end portions, said arcuate portion being substantially conformingly received in, and said end portions being situated outwardly of, said recess in an assembled position of said spring member relative to said brake shoe;
   fastening means on at least one, and positively engaging in said assembled position the other, of said spring and carrier members for retaining said spring member on said brake shoe against relative movement at least in one axial direction of said recess and
   wherein said fastening means includes means for defining at least one wall member in said carrier member within said recess, said wall member axially abutting at least a part of said arcuate portion of said spring member.

5. The brake shoe assembly as defined in claim 1, wherein said wall member includes at least one rib in said recess adjoining said part of said arcuate portion of said spring member at one axial end of the latter in said assembled position.

6. The brake shoe as defined in claim 5, wherein said fastening means further includes at least one web portion on said carrier member situated at the other axial end of said spring member in said assembled position.

7. The brake shoe assembly as defined in claim 6, wherein said spring member is a leaf spring having an axial end portion at said other end and at least one recessed zone in said axial end portion which at least partially receives said web portion in said assembled position.

* * * * *